United States Patent [19]

Burg

[11] 4,250,679
[45] Feb. 17, 1981

[54] FRAME STRUCTURE HAVING REINFORCED JOINTS

[76] Inventor: Robert J. Burg, 508B High Point Dr., Hartsdale, N.Y. 10530

[21] Appl. No.: 63,362

[22] Filed: Aug. 3, 1979

[51] Int. Cl.³ .......................................... E04H 12/00
[52] U.S. Cl. ........................................ 52/654; 52/648; 52/721
[58] Field of Search ................. 52/721, 654, 667, 668, 52/648, 690; 403/240, 241, 263, 255, 254, 190, 230; 211/190, 191, 207

[56] References Cited

U.S. PATENT DOCUMENTS

| | | | |
|---|---|---|---|
| 1,055,522 | 3/1913 | Cumming | 403/353 X |
| 2,439,049 | 4/1948 | Lesko | 211/190 |
| 3,195,735 | 7/1965 | Jay | 403/49 X |
| 3,237,779 | 3/1966 | Eger | 211/191 |
| 3,358,848 | 12/1967 | Johnsson | 52/721 X |
| 3,465,895 | 9/1969 | Miller | 403/353 X |
| 3,503,641 | 3/1970 | Fraser | 52/667 X |

Primary Examiner—Price C. Faw, Jr.
Assistant Examiner—Carl D. Friedman
Attorney, Agent, or Firm—Watson, Leavenworth, Kelton & Taggart

[57] ABSTRACT

A framing structure comprises a vertical post of hollow metal tubing having an aperture for receiving a horizontal cross-member also of hollow metal tubing. A slot is formed near one end of the cross-member to hook onto the bottom edge of the wall defining the aperture in the post. A reinforcing plug having a slot of about the same size as the slot in the cross-member is inserted into the end of the cross-member so that the slots are in substantial register. The reinforcing plug strengthens the joint by effectively increasing the wall thickness in the area of the joint, thereby allowing use of relatively thin-walled and inexpensive cross-members without having the slots compromise the structural integrity of the framing structure.

14 Claims, 3 Drawing Figures

FRAME STRUCTURE HAVING REINFORCED JOINTS

BACKGROUND OF THE INVENTION

1. Field of the Invention

This invention relates to a framing structure and more particularly to a framing structure having improved means for joining the frame members.

2. Description of the Prior Art

Framing structures comprising frame members with joints that enable quick and rigid assembly are well known. Such structures are often used to form framing modules of various patterns and configurations for shelves, display racks, etageres and other framework systems. Desirable features of these structures are typically ease of assembly without recourse to special skills or tools, rugged mechanical structure, attractiveness and relatively low cost.

In a common construction of joining right angular members, a horizontal member is often provided with hook-on terminals to be supported by cooperating fittings on vertical members. Examples of structures utilizing such joining techniques are described in U.S. Pat. No. 3,465,895, issued Sept. 9, 1969; U.S. Pat. No. 3,195,735 issued July 20, 1965 and U.S. Pat. No. 1,055,522, issued Mar. 11, 1913. Horizontal cross-members, commonly referred to as stringers, that are designed for detachable mounting to vertical posts are often formed of hollow tubing because it is lightweight, relatively inexpensive and commonly available as an off the shelf item. Tubing having a rectangular cross-section is often used because it provides stiffness against bending moments in a particular plane thereby improving the rigidity of the framing structure.

SUMMARY OF THE INVENTION

To maximize simplicity of design and structural rigidity while at the same time minimizing both cost and the number of components to assemble the framing structures, the instant invention contemplates use of posts with apertures to receive and support stringers formed with slots near their ends for hooking onto the vertical members. To afford sufficient rigidity and resistance to accidental removal, it is required that these slots extend a substantial portion of the way through the stringer, perhaps half-way or more. Such slots in thin walled stringers, however, disadvantageously weaken the stringers to such an extent that the strength of the entire framing structure is seriuously impaired. The instant invention overcomes this difficulty by providing novel means for reinforcing and thereby strengthening the joint between framing members.

A three dimensional framing structure is built of several posts or columns joined together by stringers. Each column is made of relatively thick walled tubing and is provided with apertures adapted to receive the horizontal hollow frame members or stringers. Each stringer end is provided with a slot for slidably engaging the lower edge of one column aperture. Each stringer end is further provided with a reinforcing plug having dimensions such that it fits closely to the inner surface of the stringer and, once inserted, is retained therein by friction. The reinforcing plug has a slot about the same size as and, when seated in the stringer, is in substantial register with the stringer slot. When a stringer is inserted into a post aperture, the slots in register combine to engage the aperture's lower edge, thereby forming a strong, yet readily disassembled, joint.

DESCRIPTION OF THE PREFERRED EMBODIMENT

Figure 1:
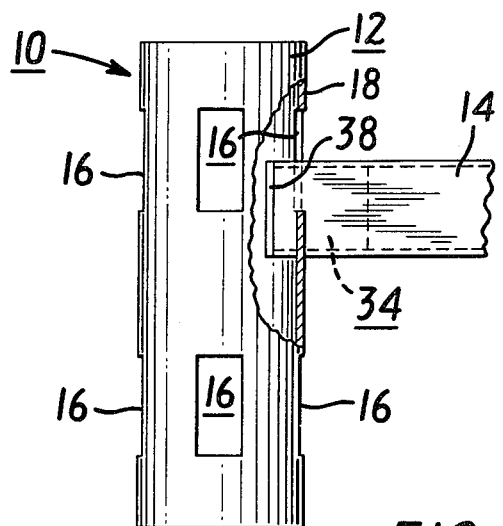
FIG. 1 is a side elevation view of an assembled framing structure joint in accordance with the present invention and partly broken away to show the joint between the frame members.
Figure 2:
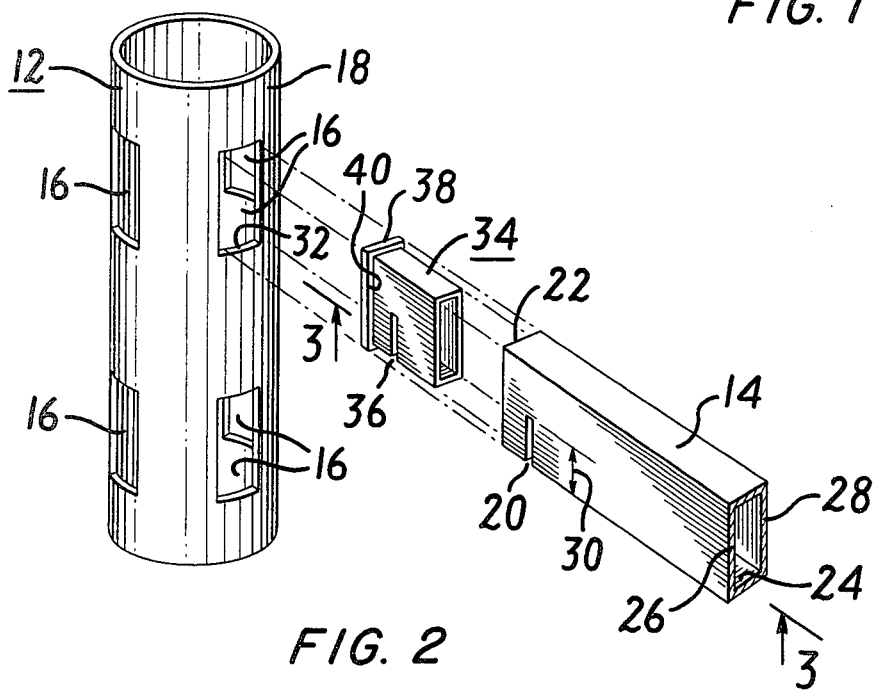
FIG. 2 is an exploded representation in perspective of the framing structure of FIG. 1 showing in detail the preferred framing components and the novel reinforcing element utilized to strength the joint between the components.
Figure 3:
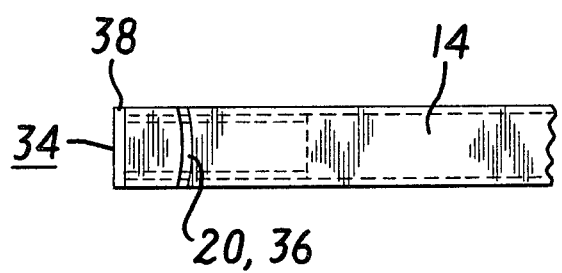
FIG. 3 is a bottom view of the horizontal frame member combined with the reinforcing element taken along line 3—3 of FIG. 2, showing arcuately formed slots therein.

Referring to the drawing, there is shown in FIG. 1 an assembled framing structure 10 comprising joined members 12 and 14 that may be used in quick assembly framework systems for shelves, racks, displays and the like. In the preferred embodiment, column 12 is formed of relatively thick walled cylindrical tubing and stringer 14 of relatively thin walled rectangular tubing. As will be readily understood by those skilled in the art, a complete framing structure will be comprised of numerous columns and stringers joined together in a three dimensional intersecting array. It should be noted that although it is preferable that the frame members 12 and 14 be joined at right angles, frame members joined at other angles are also within the scope of the invention.

Although in the preferred embodiment column 12 is formed of cylindrical tubing, and stringer 14 of rectangular tubing, both may also be formed of tubing having other cross-sections, such as square, oval, hexagonal or the like. Column 12 and stringer 14 may be made of a wide variety of materials, but a metal such as steel or aluminum is prefered.

As pointed out above, in the preferred embodiment of the invention column 12 is formed of relatively thick walled tubing and stringer 14 of relatively thin walled tubing. For example, in a framing system to be used for shelving in a home, both column 12 and stringer 14 may be made of cold-rolled steel, the column having a wall thickness of about 1/16 inch (1.59 mm) and the stringer having a wall thickness of about 1/32 inch (0.79 mm).

To join the stringer 14 to column 12, an aperture 16 is provided in the wall 18 of column 14. In the embodiment herein described, the aperture 16 is generally rectangular in order to allow insertion of rectangular stringer 14. A plurality of apertures 16 are provided in column 12 to accept a plurality of stringers used to erect a three dimensional structure in which the joints are made in accordance with the invention described herein. Preferably such a structure would be composed of four columns and at least eight stringers, but a lesser number of either, for example three columns and six stringers, or a great number are also contemplated by the instant invention. Moreover, the ratio between the number of columns or stringers need not be 2:1.

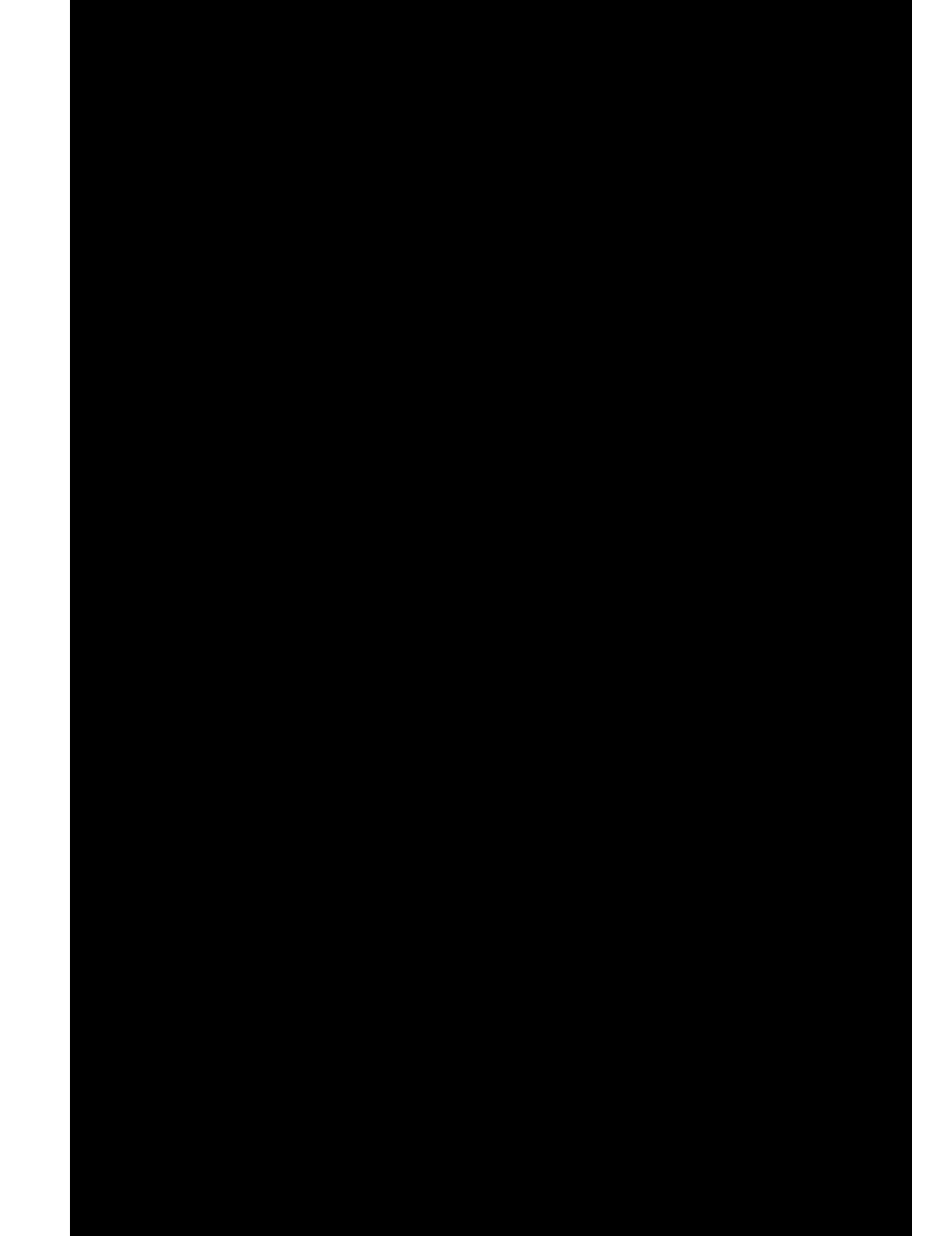

A slot 20 is formed proximate the end 22 of stringer 14. The slot 20 is formed to extend through the bottom wall 24 and through the adjacent side walls 26 and 28 a portion of their height. In order to assure a secure joint,